No. 734,121. PATENTED JULY 21, 1903.
P. T. DODGE.
LINOTYPE MACHINE.
APPLICATION FILED DEC. 26, 1902.
NO MODEL. 14 SHEETS—SHEET 1.

Witnesses.

Inventor.

No. 734,121. PATENTED JULY 21, 1903.
P. T. DODGE.
LINOTYPE MACHINE.
APPLICATION FILED DEC. 26, 1902.
NO MODEL. 14 SHEETS—SHEET 2.

Witnesses.
W. R. Kennedy
A. M. E. Kennedy

Inventor:
P. T. Dodge

No. 734,121. PATENTED JULY 21, 1903.
P. T. DODGE.
LINOTYPE MACHINE.
APPLICATION FILED DEC. 26, 1902.
NO MODEL. 14 SHEETS—SHEET 8.

No. 734,121. PATENTED JULY 21, 1903.
P. T. DODGE.
LINOTYPE MACHINE.
APPLICATION FILED DEC. 26, 1902.
NO MODEL. 14 SHEETS—SHEET 9.

Witnesses.
W. R. Kennedy
A. W. C. Kennedy

Inventor:
P. T. Dodge

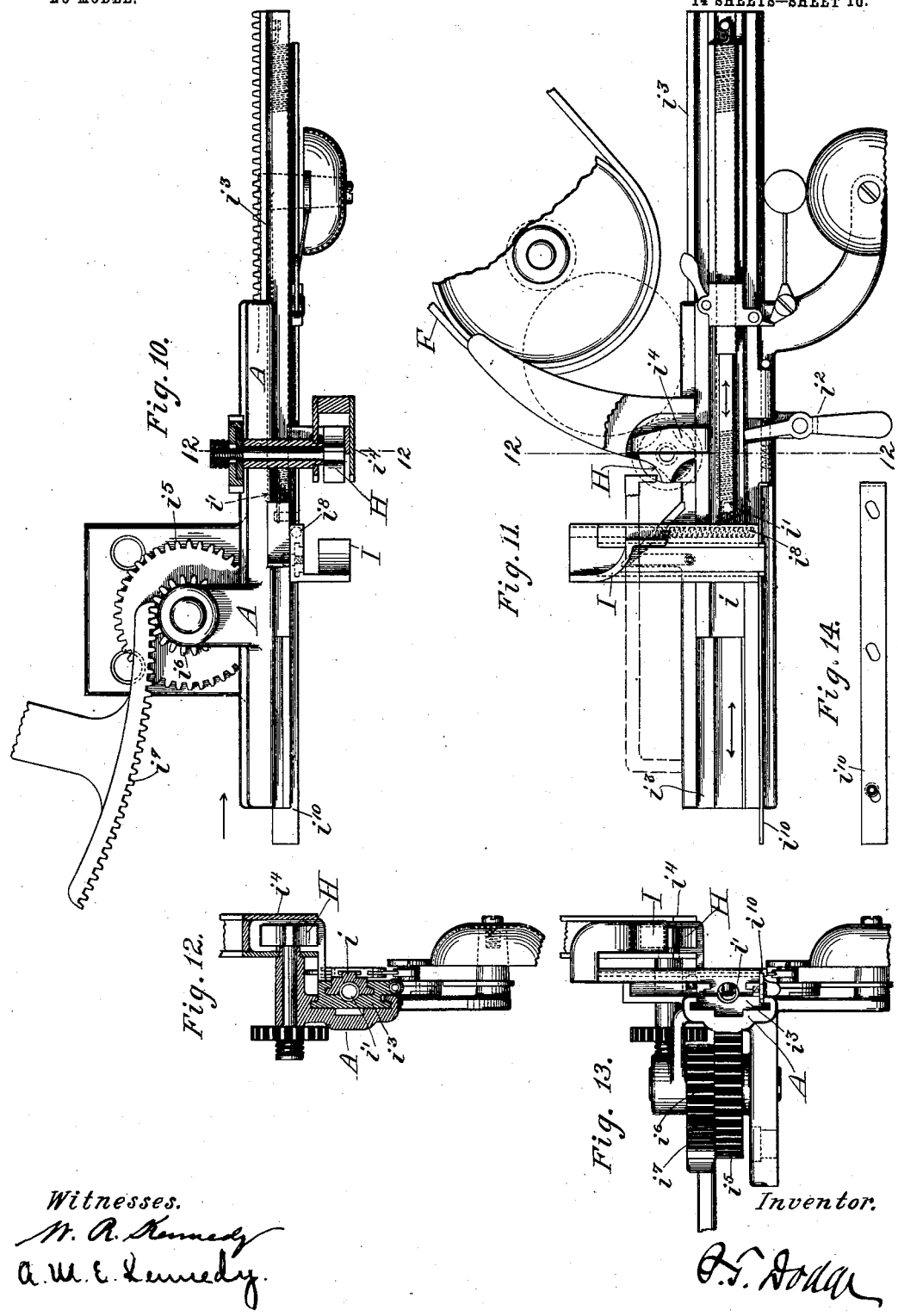

No. 734,121. PATENTED JULY 21, 1903.
P. T. DODGE.
LINOTYPE MACHINE.
APPLICATION FILED DEC. 26, 1902.
NO MODEL. 14 SHEETS—SHEET 11.

Witnesses. Inventor.

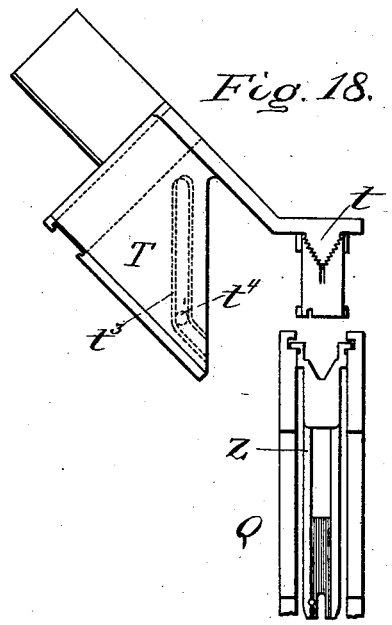
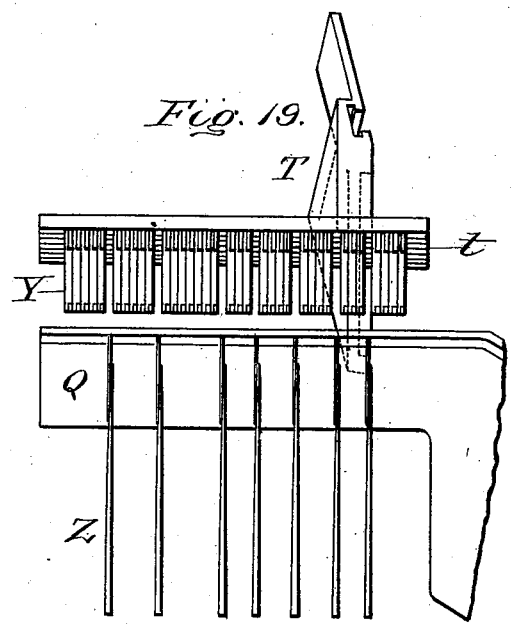
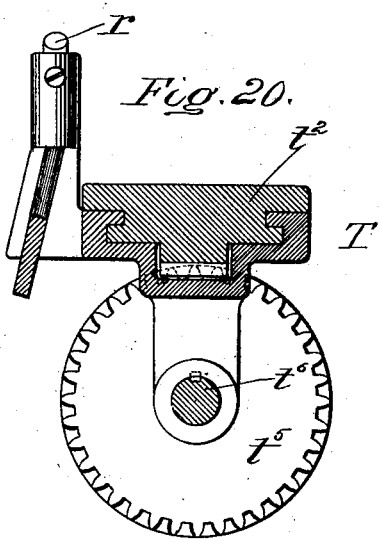

No. 734,121. PATENTED JULY 21, 1903.
P. T. DODGE.
LINOTYPE MACHINE.
APPLICATION FILED DEC. 26, 1902.
NO MODEL. 14 SHEETS—SHEET 13.
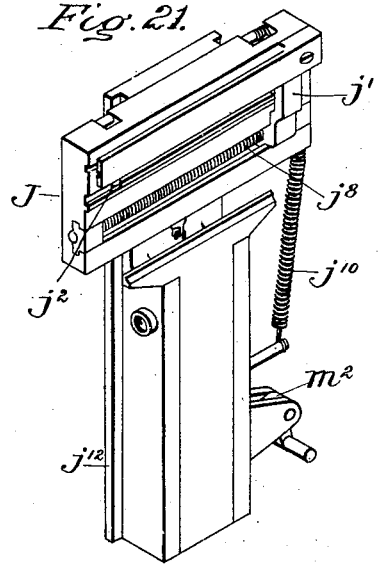
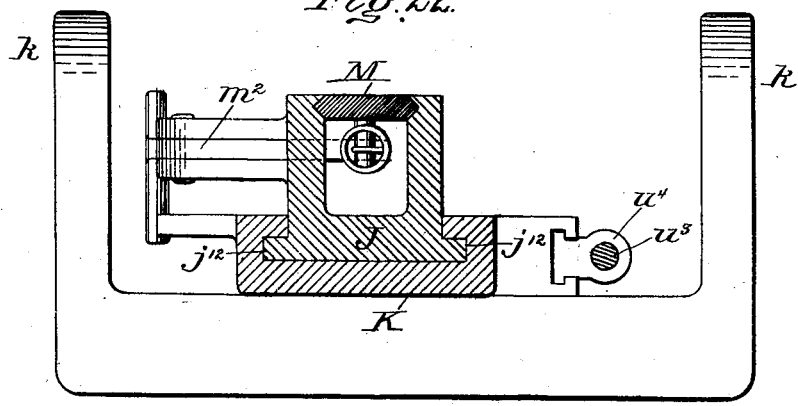
Witnesses. Inventor.

No. 734,121. PATENTED JULY 21, 1903.
P. T. DODGE.
LINOTYPE MACHINE.
APPLICATION FILED DEC. 26, 1902.
NO MODEL. 14 SHEETS—SHEET 14.
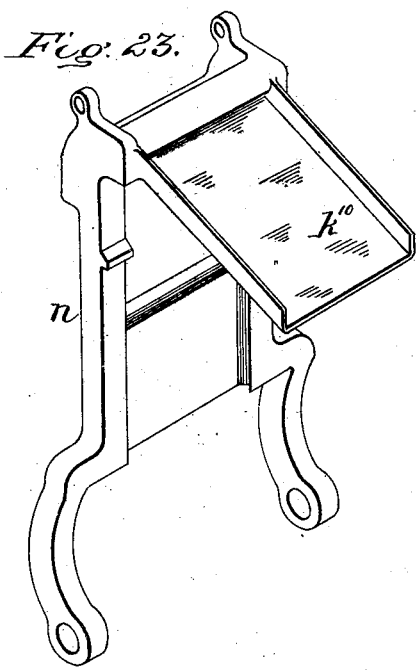
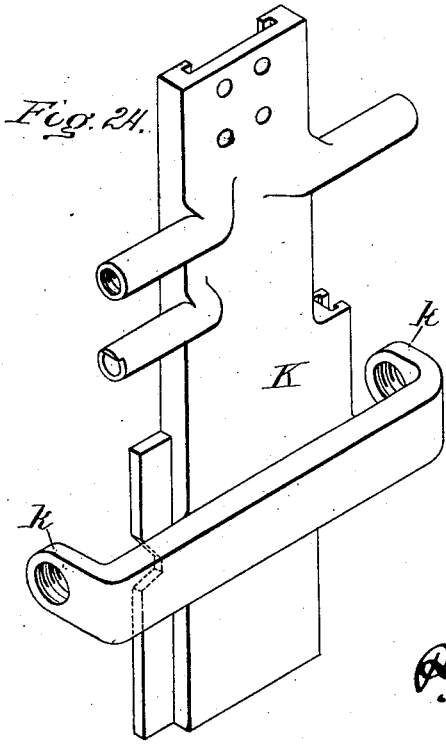
Witnesses.
Inventor.

No. 734,121. Patented July 21, 1903.

UNITED STATES PATENT OFFICE.

PHILIP T. DODGE, OF NEW YORK, N. Y., ASSIGNOR TO MERGENTHALER LINOTYPE COMPANY, A CORPORATION OF NEW YORK.

LINOTYPE-MACHINE.

SPECIFICATION forming part of Letters Patent No. 734,121, dated July 21, 1903.

Application filed December 26, 1902. Serial No. 136,605. (No model.)

*To all whom it may concern:*

Be it known that I, PHILIP T. DODGE, of New York city, county of New York, and State of New York, have invented a new and useful Improvement in Linotype-Machines, of which the following is a specification.

This invention has reference to that class of linotype or line-casting machines wherein a series of individual letter-matrices and expanding spacers are arranged to circulate, passing from the magazines in which they are stored successively to an assembler, in which they are assembled or composed in line, thence to the face of a slotted mold, which is temporarily closed by them to form the letters or characters in relief on the edge of a slug formed by forcing molten typemetal from a melting-pot into the mold, after which the resulting slug is ejected from the mold, past trimming-knives, while the matrices and spacers are returned to the magazines from which they were delivered.

The aim of the invention is to produce a machine more simple than those ordinarily in use and less liable to disarrangement of its parts.

To this end the invention consists in the construction and combination of the various parts hereinafter described in detail.

Figure 1:
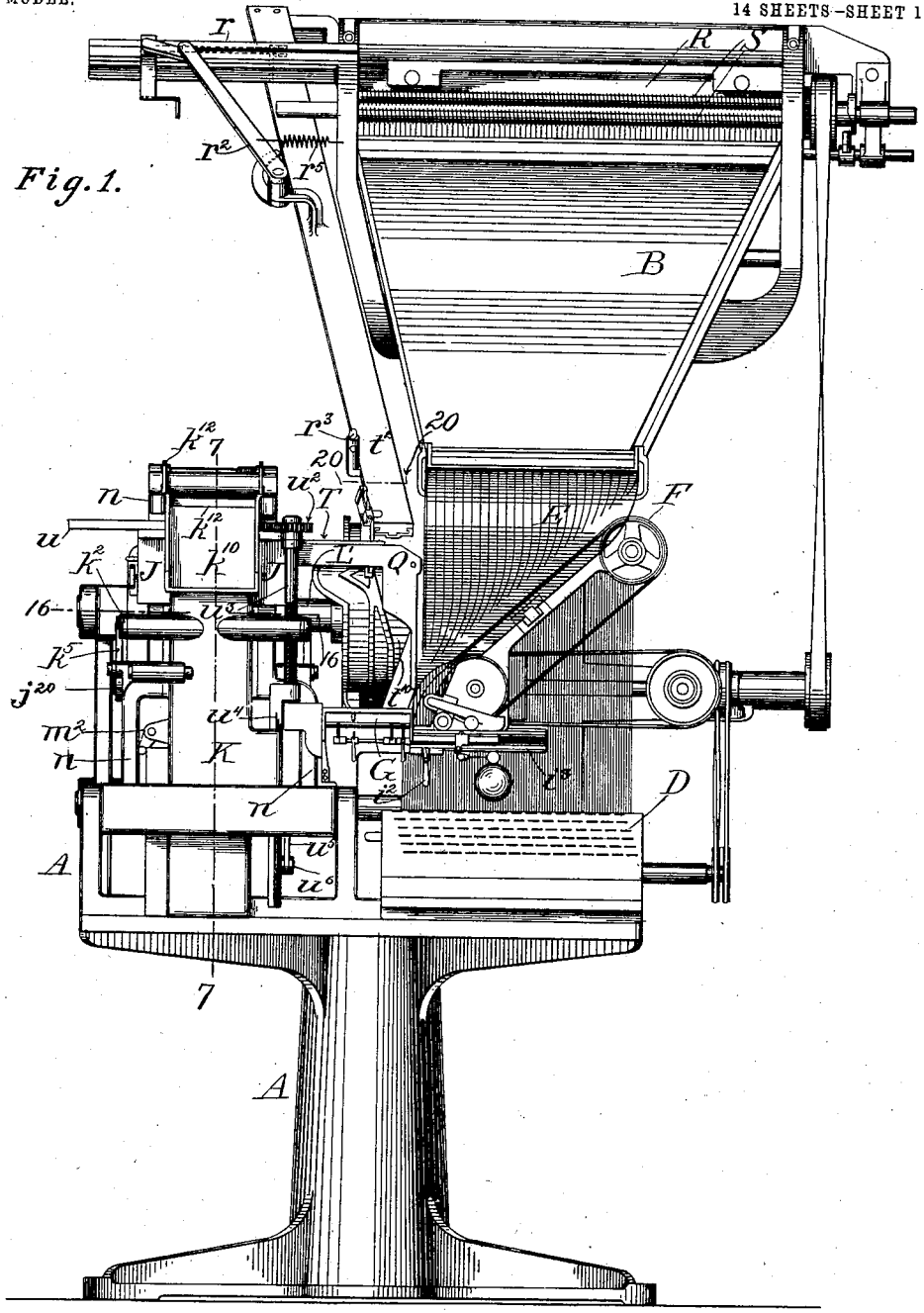
Figure 2:
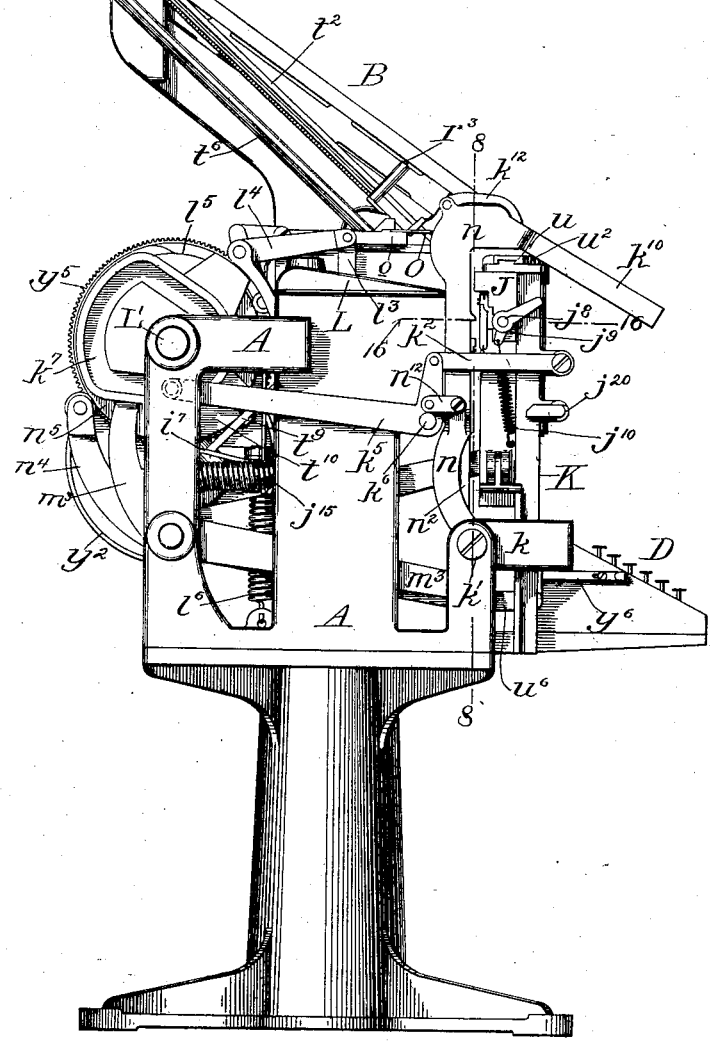
Figure 3:
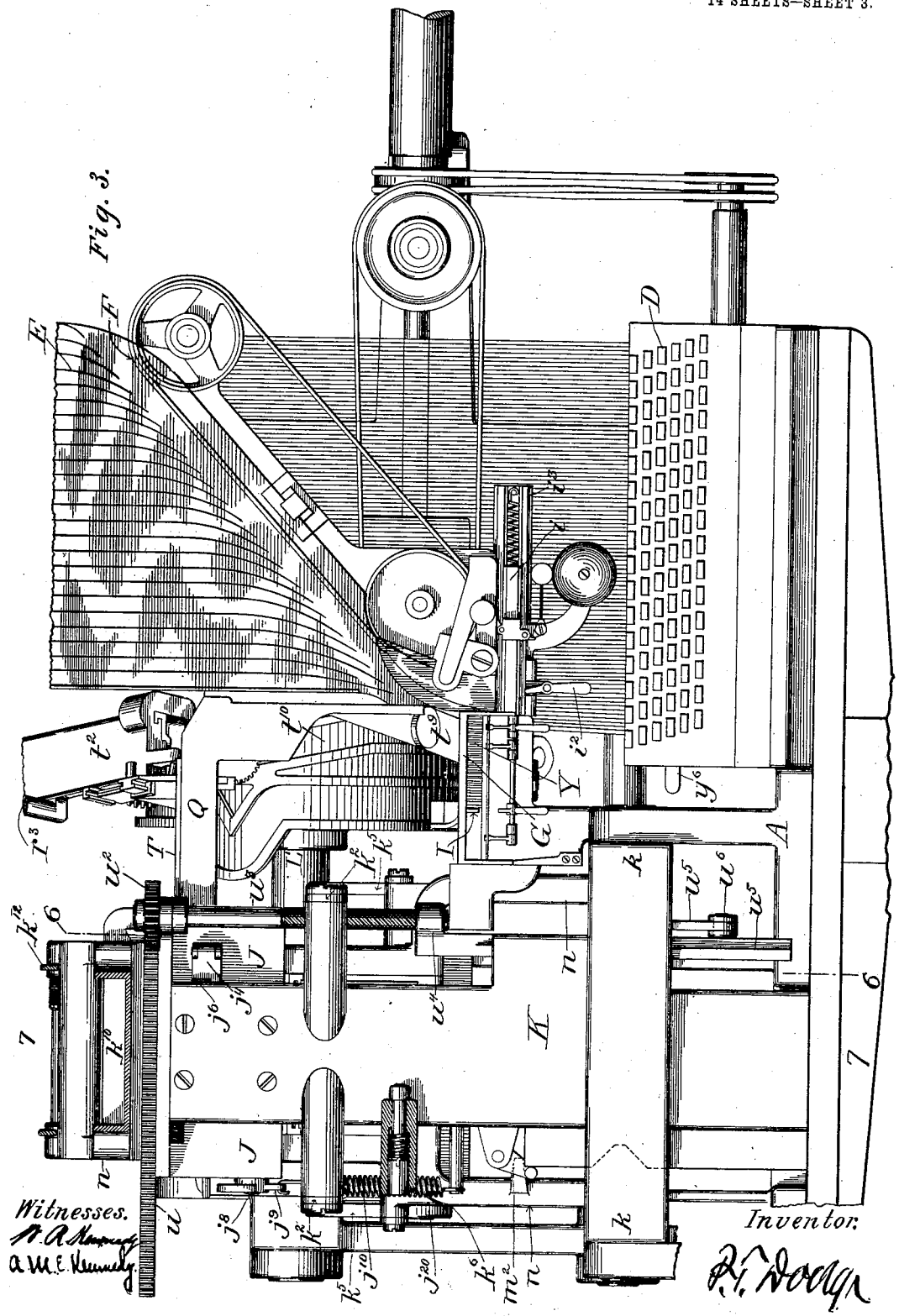
Figure 4:
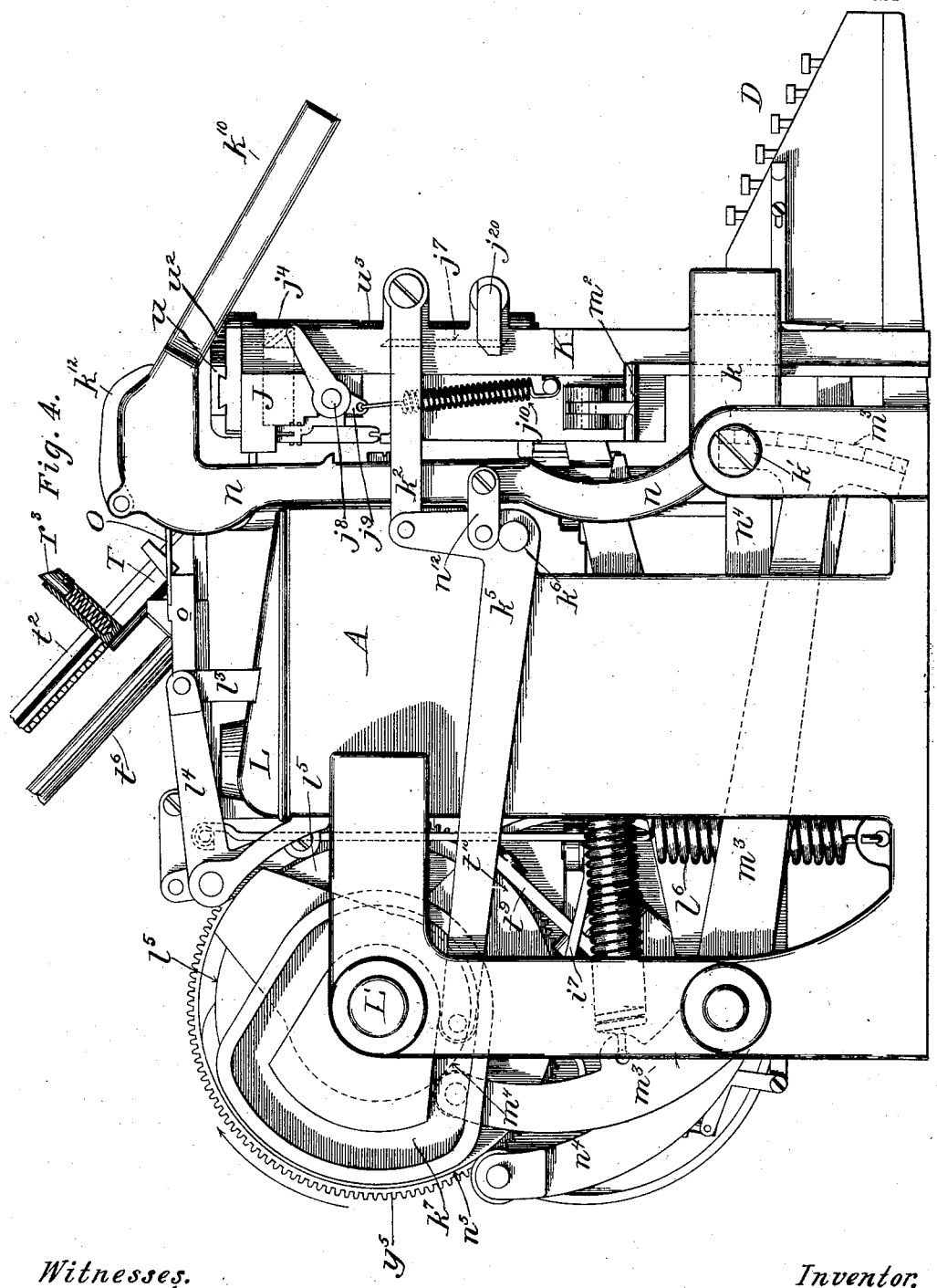
Figure 5:
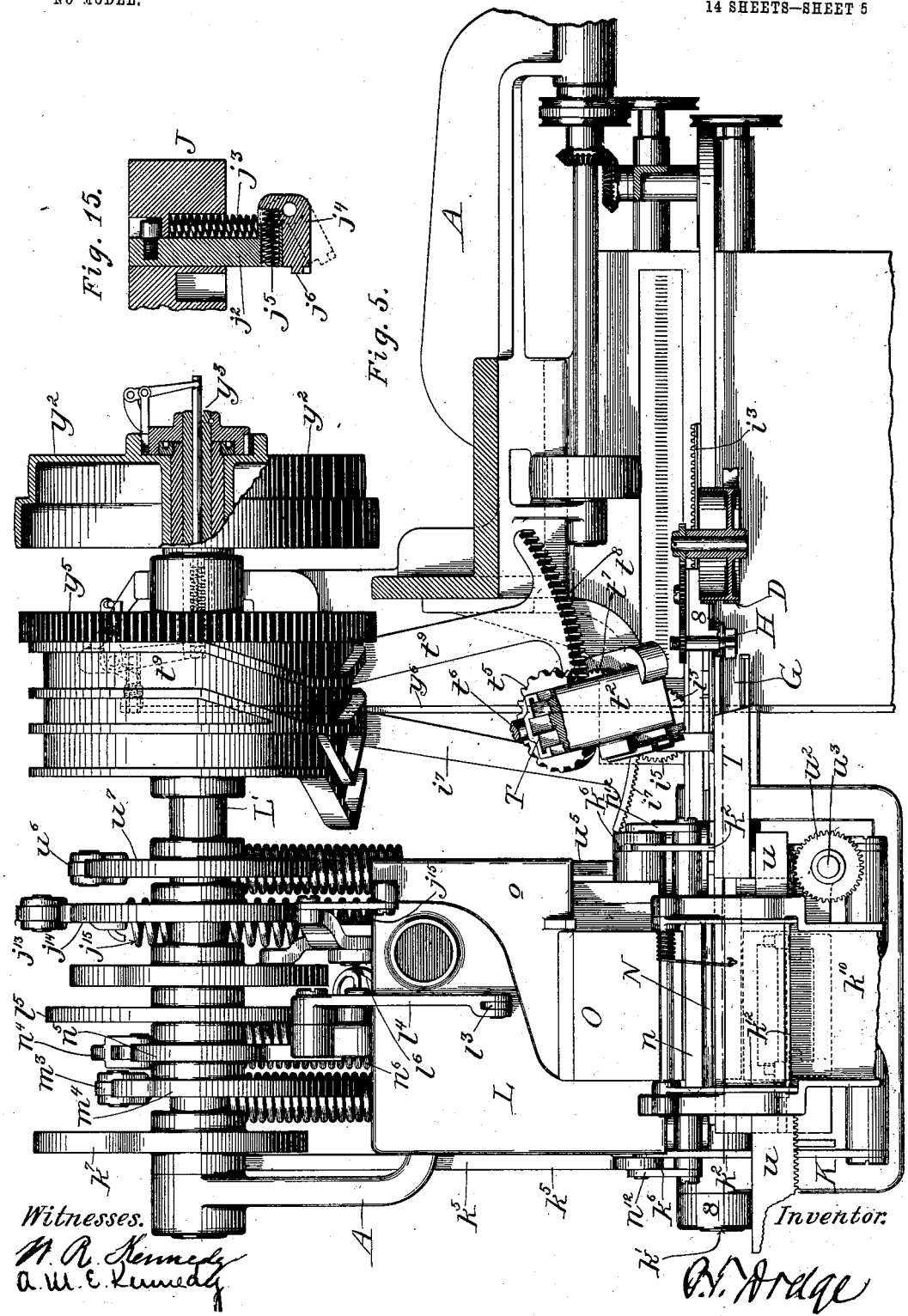
Figure 6:
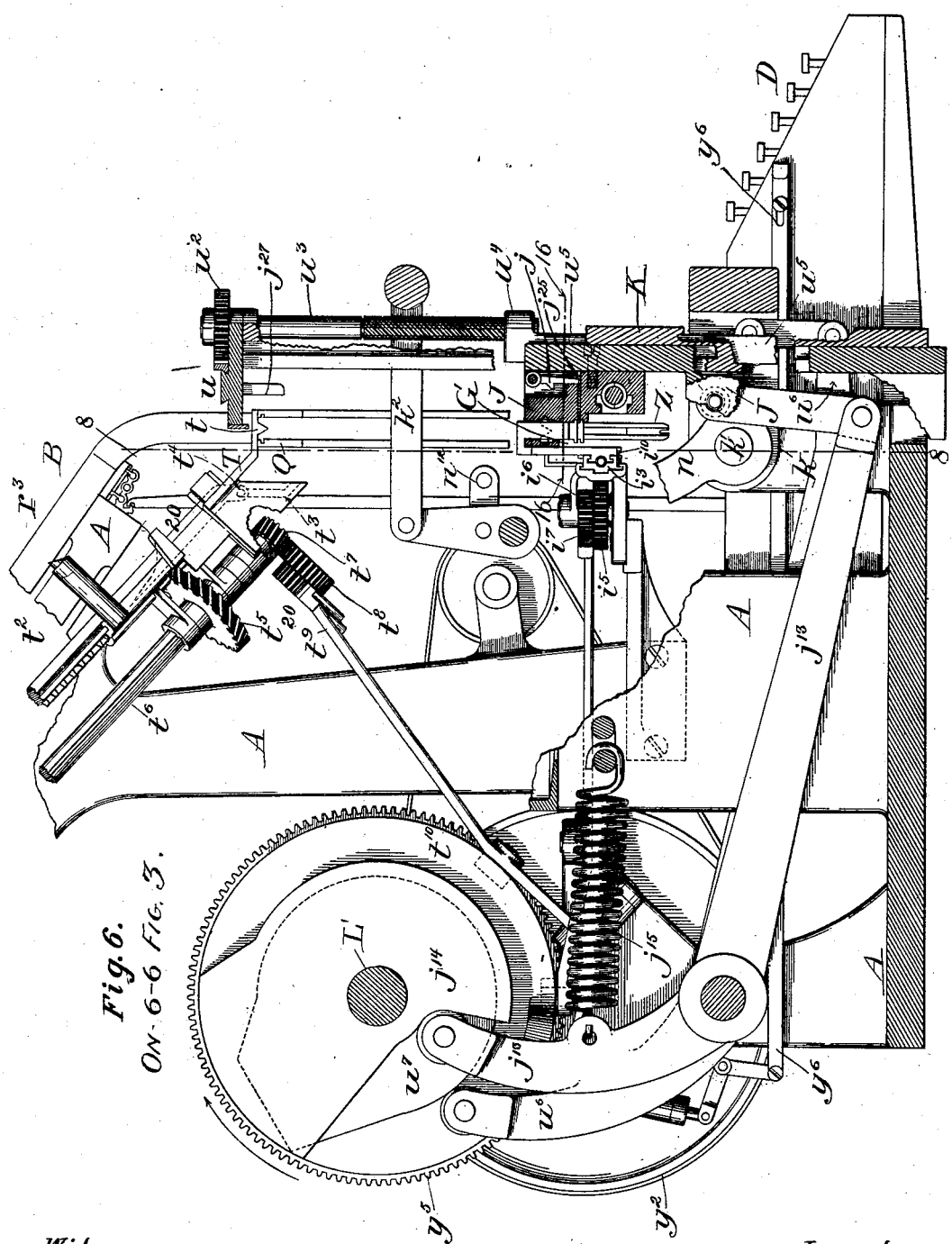
Figure 7:
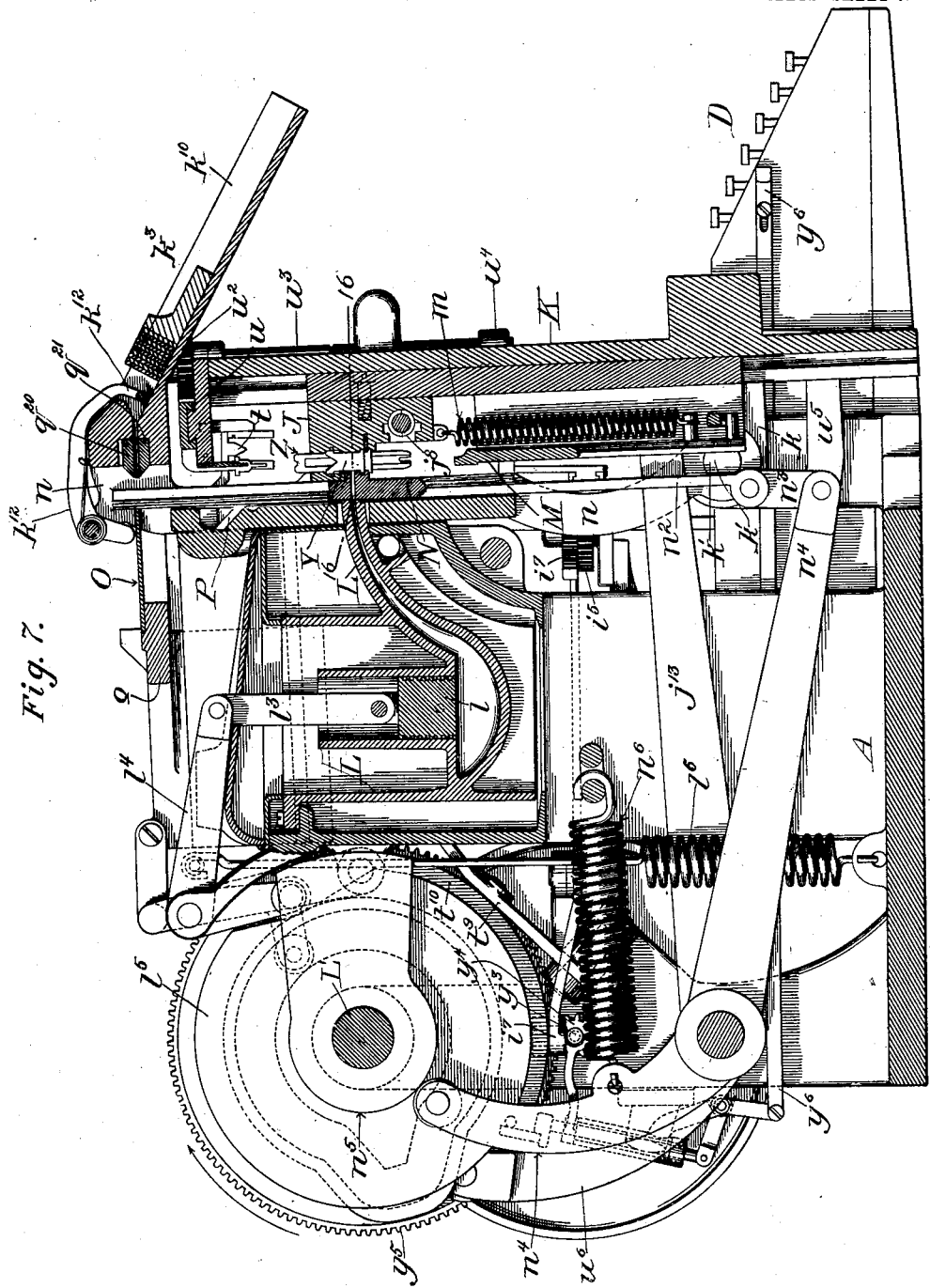
Figure 8:
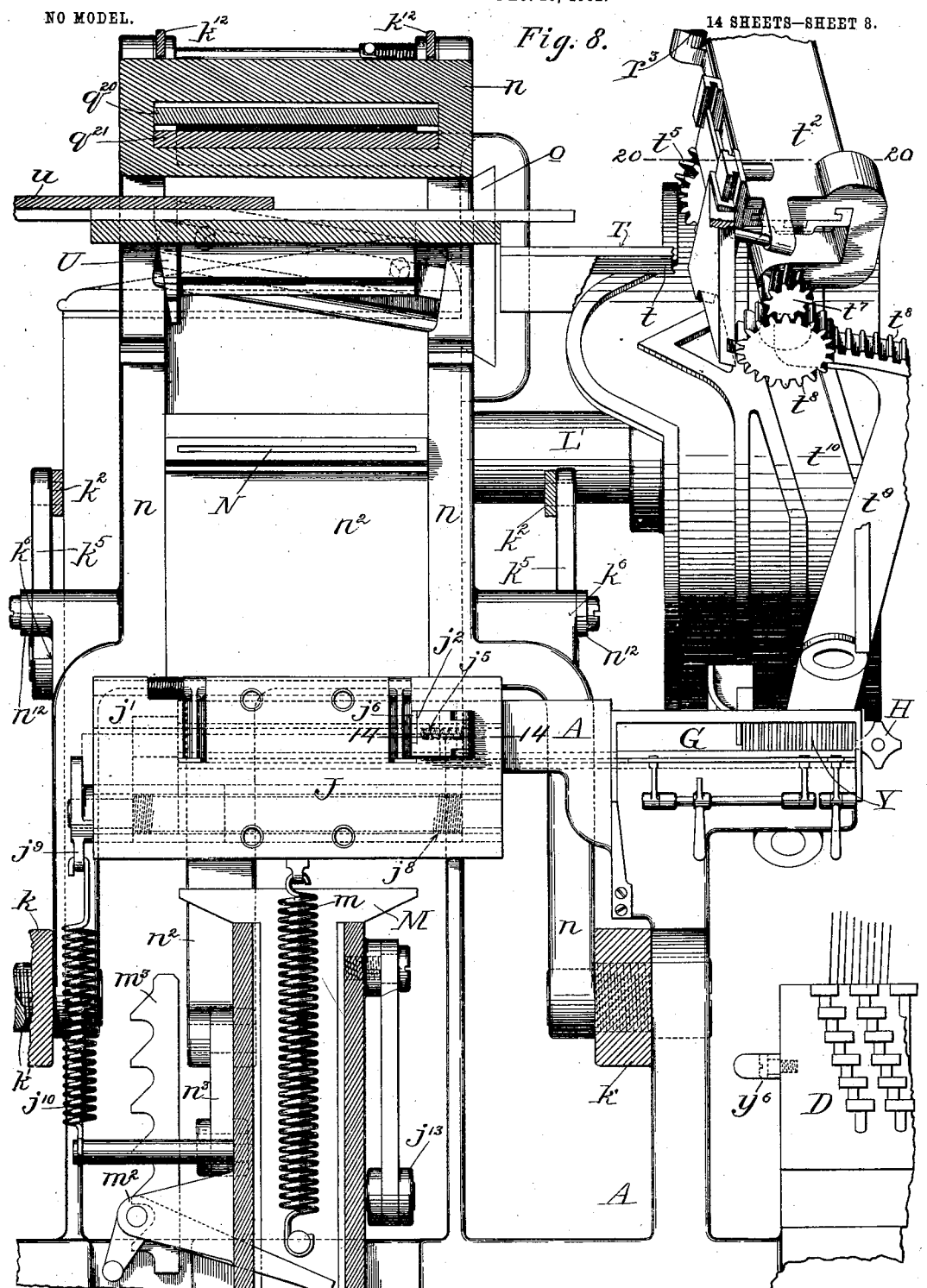
Figure 9:
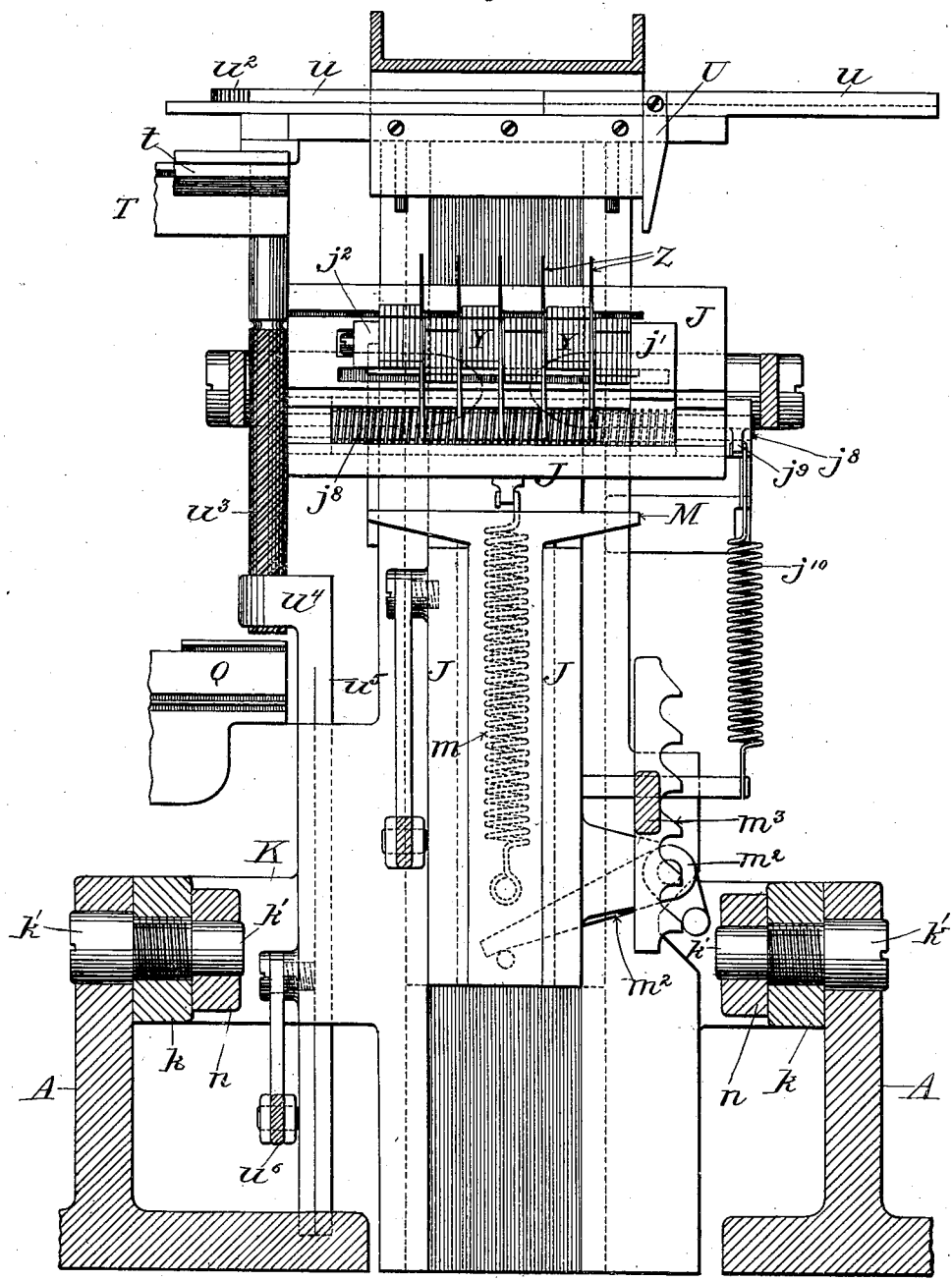
Figure 16:
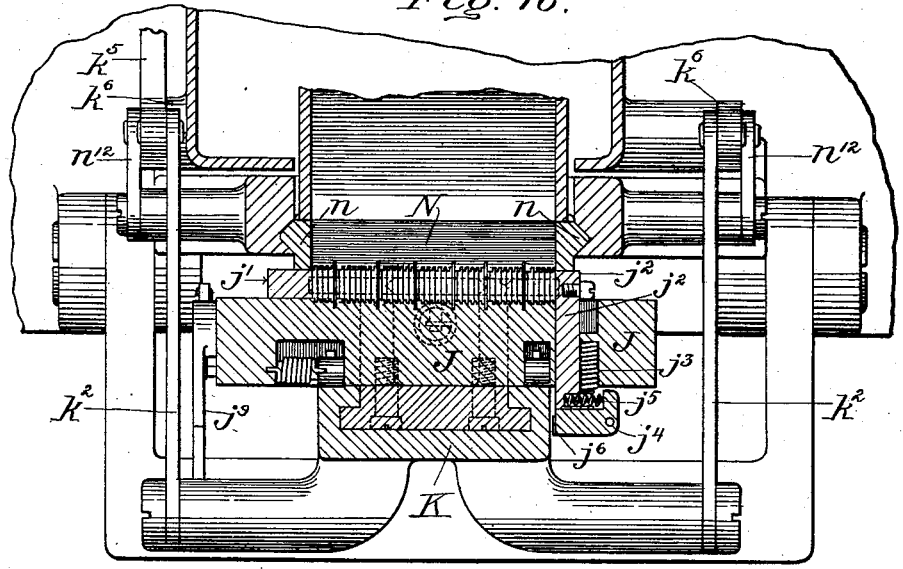
Figure 17:
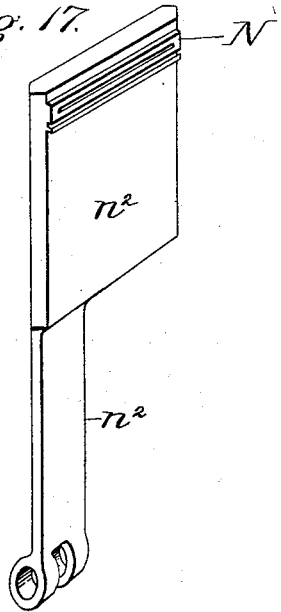

Referring to the drawings, Figure 1 represents a front elevation of the machine; Fig. 2, a side elevation of the same from the left; Fig. 3, a front elevation of the assembling and casting mechanisms; Fig. 4, a side view of the parts shown in the preceding figure. Fig. 5 is a top plan view of the parts shown in the two preceding figures, the driving-clutch and minor parts being shown in horizontal section. Fig. 6 is a vertical section from front to rear on the line 6 6, Fig. 3, illustrating more especially the mechanism for supporting and transferring the matrix-lines. Fig. 7 is a vertical section on the line 7 7, Figs. 1 and 3, through the casting devices and adjacent parts. Fig. 8 is an elevation looking rearward from the line 8 8, Figs. 2, 5, and 6. Fig. 9 is an elevation looking against the rear face of the vise-frame and the mechanism for holding the matrix-line, the justifying devices, &c. Fig. 10 is a top plan view of devices for assembling the matrices in line, portions being shown in section. Fig. 11 is a front elevation of the same. Fig. 12 is a vertical cross-section on the line 12 12 of the two preceding figures. Fig. 13 is an end elevation looking in the direction of the arrow, Figs. 10 and 11. Fig. 14 is a view of a detail. Fig. 15 is a horizontal section through one of the matrix-confining jaws on the line 14 14, Fig. 8. Fig. 16 is a horizontal section on the line 16 16, Figs. 1, 2, 6, and 7. Fig. 17 is a view of the mold and its supporting-slide. Figs. 18 and 19 are respectively a front elevation and a side view of mechanism for supporting the matrices and spacers preparatory to their distribution. Fig. 20 is a cross-section on the line 20 20, Figs. 1, 8, &c. Fig. 21 is a perspective view showing the vise-frame in which the matrix-line is supported, together with one of the confining-jaws and the slide for operating the spacers to effect justification. Fig. 22 is a horizontal cross section of the foregoing parts. Figs. 23 and 24 are perspective views of portions of the frame.

I employ in my machine matrices and expansible wedge spacers such as are commonly used in Mergenthaler linotype-machines at the present day. The matrices are of the kind shown at Y, Figs. 18 and 19, each provided with a character or matrix proper in one edge, with a series of distributing-teeth in the upper end and with protruding ears on the vertical edges to guide them through the magazines and to sustain them in position while traveling through the machine. The spacers Z, also shown in the same figures, consist of two oppositely-tapered wedges connected by a sliding joint, the upper and shorter wedge being provided with sustaining-ears at its edges.

The machine as a whole is constructed with special reference to the handling of matrices and spacers of the form shown.

Referring to Figs. 1, 2, and 3, A represents a rigid main frame, which may be of any form and construction adapted to sustain the operative parts. B represents a stationary inclined magazine, consisting mainly of parallel plates grooved in their proximate faces to receive and guide the ears of the matrices which are delivered into the upper end by the distributer and permitted to pass through by gravity and finally delivered one at a time from the lower end as they are to be called into action. The mouth of the magazine is provided, as usual, with escapement devices to discharge the matrices, connected through intermediate devices with finger-keys D. The matrices released from the mouth of the magazine fall through guide-channels E onto an inclined belt F, by which they are carried downward and delivered successively to the end of channeled assembler G, into which they are forced by the star-wheel H, Figs. 10 and 11.

The foregoing parts may all be constructed and arranged to operate in the same manner as in the Mergenthaler machine represented in Letters Patent No. 436,532.

In the Mergenthaler machine the composed line of matrices is lifted from its original position before being transferred. In the present machine the line is carried forward directly and horizontally to the casting mechanism. This necessitates a special device to resist the matrices as they are being assembled in line, one which can be lifted clear of the line when the latter is to be transferred. I therefore adopt the construction shown in Figs. 1, 10, 11, 12, and 13, in which I represents the resisting-finger standing normally in the channeled assembler opposite the star-wheel H, so that as the matrices are added and the line elongated the resistant yielding horizontally before the line holds the matrices in close order. This finger is arranged to slide vertically in guides on the front of the horizontal slide $i$, which is urged constantly to the right by springs $i'$. A pivoted dog $i^2$, weighted at the lower end, frictionally engages the slide $i$, so that as the resistant is pushed forward by the matrices and the star-wheel behind them they are prevented from retreating. In this manner a space is left at the end of the line in front of the star-wheel for the admission of each matrix. The resistant slide $i$ is mounted on the larger horizontal slide $i^3$, mounted in the main frame and having lips $i^4$, which stand normally alongside of the star-wheel behind the incoming matrices. It will be observed that the matrix-line is confined between these lips on the slide $i^3$ and the resistant I, which is also supported through the intermediate parts from the same slide. When, therefore, the composition of the line in the stationary assembler is completed, its transfer endwise to the left to the casting mechanism may be effected by moving the slide $i^3$, which carries with it the finger I. The slide $i^3$ is thus actuated by means of teeth formed on its rear face and engaged by a pinion $i^5$, carrying a second pinion $i^6$, which receives motion through a vibrating sector-rack $i^7$, Fig. 10. When the composed line is transferred by the movement of the slides, as above described, it is necessary to raise the finger I away from the front end of the line in order that it may remain at rest while the slide returns to its original receiving position. This is accomplished, as shown in Figs. 10 and 11, by providing a spring $i^8$ to raise the finger I when it is released and by mounting in the lower part of the slide a plate $i^{10}$, arranged to lock endwise into the lower part of the finger to hold it down. This locking-plate $i^{10}$ (shown detached in Fig. 14) has oblique grooves through which fastening-screws are passed, so that when moved endwise it is also compelled to move edgewise. At one end this plate is acted on by a spring, whereby it is held normally in position to keep the finger I down. The end of the plate or slide $i^{10}$ projects beyond the slide $i^3$, and when the latter is moved to transfer the line the projecting end of the plate $i^{10}$ encounters the frame and is driven endwise in relation to the slide, thereby unlocking the resisting-finger I, which is automatically lifted clear of the line that it may return thereover.

To the left of the assembler G and forming a continuation of the same is a vise-frame J, designed to receive the line supported in front of the casting mechanism and finally raise it to the top of the machine preparatory to distribution. When the transfer-slide $i^3$, already referred to, carries the line forward, the matrices and spacers are sustained by their ears in the top of the vise-frame J, as shown in Figs. 6 and 7. Thereafter the vise rises until the edges of the matrices are presented directly in front of the slotted mold N, the rear side of which communicates with the delivery-mouth of the melting-pot L, from which the molten metal is delivered by the plunger $l$, as usual in this class of machines.

For the purpose of confining the line endwise in front of the mold and limiting its length when justified the vise J is provided with a fixed jaw $j'$, against which the forward end of the matrix-line is carried, as shown in Figs. 8, 9, 16, and 21, and also with a movable jaw $j^2$, arranged to slide forward and backward. This jaw is retracted during the advance of the line. It is afterward projected past the rear end of the line, as shown in Fig. 16, so that the line is confined endwise between the two jaws. The movement of the jaw is effected as shown in Figs. 3, 4, and 15. A spring $j^3$ is applied to force it open when released. To the rear or outer end of the jaw there is connected by a vertical pivot a block $j^4$, acted upon by a spring $j^5$, which tends to keep it closed against the jaw. On the end of this pivoted block there is an inclined face $j^6$. When the vise-frame rises, with the matrix-line toward the casting mechanism, the inclined face of the block $j^4$ rides against the beveled end of a vertical rib $j^7$ in the frame, the effect of which is to crowd the jaw forward and hold it forward until after the casting action, when the vise is raised to a still higher position in order that the matrices may be delivered to the distributer. When it thus rises, the end of the pivoted block is carried above the rib $j^7$, as shown in Fig. 4, and released, thus permitting the jaw to spring open again.

In order that the matrices in the line may be loosened subsequent to justification, so that the sliding jaw may move backward and allow the wedges on the spacers to fall to their normal positions, it is necessary to give a slight horizontal movement to the jaw $j'$. This is accomplished by a screw $j^8$, passing through the jaw and journaled in the vise-frame, as plainly shown in Figs. 7, 9, and 21. This screw is provided on one end with a crank-arm $j^9$, acted upon by a spring $j^{10}$, which tends to close the jaw. As the vise rises to position for delivering the matrices this crank-arm rides against the pivoted trip-arm $j^{20}$ on the frame, giving a slight rotation to the screw and backing the jaw $j'$ far enough to relieve the matrices from the pressure to which they are subjected by the advance of the wedge spacers during justification, as usual.

The vise-frame J is of the form shown in Figs. 21 and 22, with vertical guides $j^{12}$ on its sides. These guides are seated in a vertically-grooved plate or frame K, (see Figs. 1, 3, 4, 6, 7, 9, 22, and 24,) having near the lower end supporting-ears $k$, mounted on a horizontal pivot-pin $k'$, fixed in the main frame. This arrangement permits the plate K, together with the vise-frame therein, to swing forward and backward to a limited extent in order that the matrix-line and the mold may move to and from the melting-pot, as presently explained. This movement of the frame K is secured, as shown in Fig. 4, by links $k^2$, connecting the upper part of the frame K with angular levers $k^5$, pivoted to the main frame at $k^6$ and having at their rear ends lateral rollers or studs riding in a grooved cam $k^7$, mounted on the horizontal main shaft $L'$, mounted in the main frame. The vertical movement of the vise in the vibrating frame K is effected, as shown in Fig. 6, by a lever $j^{13}$, pivoted in the main frame, its forward end being connected by a link to the vise and its rear end provided with an antifriction-roller acted upon by a cam $j^{14}$ on the main shaft. The lever and cam serve to raise the vise, while the spring $j^{15}$, acting on the lever, insures the descent of the vise as the lever is relieved by the cam. It will be observed that the cam is so formed that the vise is held at the assembling-level to receive the matrices from the assembler, then raised to the casting-level and permitted to rest, and finally lifted to the top of the machine to permit the matrix-line to be carried to the distributer. While the matrix-line is confined in the vise between its jaws and in front of the mold, before described and illustrated in Figs. 7 and 9, justification is effected by pushing the long wedges of the spacers upward through the line in order to elongate same. This is effected by the vertical slide M, mounted on guides in the vise-frame, as shown in Figs. 7, 9, 21, and 22. This justifier-slide is drawn upward to act on the spacers by a spring $m$. Justification is effected by repeated strokes of the plate M against the lower ends of the spacers Z. The retraction of the plate from the spacers preparatory to each stroke is secured, as shown in Fig. 9, by an angular lever $m^2$, pivoted to the vise-frame and engaging at one end with the slide M, while the opposite end is formed with a stud to ride against the toothed or serrated end of a lever $m^3$, pivoted in the main frame, acted upon at its rear end by a cam $m^4$. Through the spring $m$ and the toothed lever acting in opposition thereto the slide is caused to strike the spacers repeatedly but lightly to drive them upwardly.

The mold N, which is of the usual slotted pattern, is removably secured in a supporting-plate $n^2$, which slides vertically in a frame $n$, such as separately shown in Fig. 23, mounted at its lower end on the pivot-pin $k'$, before referred to, as supporting the frame K, on which the vise slides. It will be observed, therefore, that the vise J and the mold N are arranged to swing around a common center, but independently, to and from the melting-pot, and this in order that the matrices may be closed tightly against the mold and the mold closed tightly against the pot during the casting operation, and the parts subsequently separated to break the base of the slug away from the mouth of the pot and to withdraw the type characters on the edge of the slug contained in the mold from the matrices.

The forward and backward motion of the mold is secured, as shown in Fig. 2, by a link $n^{12}$, connecting the mold-frame N with the lever $k^5$, which vibrates the vise-frame, as previously explained, the various centers being so located that the vise and the mold are moved different distances and at different rates of speed to effect their proper separation and union.

The foregoing construction admits of the use of a stationary pot L, bolted to the frame in place of the movable or swinging pot of the Mergenthaler machine.

The delivery of the metal from the pot is effected by the usual plunger $l$, connected by links $l^3$ to the angular lever $l^4$, pivoted to the main frame and actuated at its rear end through a stud or roller on its side by a peripherally-acting lifting-cam $l^5$ and a depressing-spring $l^6$.

After the slug or linotype is cast in the mold and preparatory to its ejection after the mold and vise are separated from each other and from the pot the mold slides upward until the slug is presented in front of a horizontally-reciprocating ejector-blade O, carried by a slide $o$ in the top of the main frame above the melting-pot. This arrangement of the injector directly over the melting-pot so that the mold has only to be moved vertically is a wholly new feature in this class of machines. The vertical movement of the mold is secured by mounting its supporting-plate $n^2$ to slide vertically in the vibrating frame N and by connecting the plate $n^2$ at its lower end through link $n^3$ with lever $n^4$, pivoted in the main frame and acted upon at its rear end by cam $n^5$, which causes the lifting of the mold, and by a spring $n^6$, which effects its depression as the cam relieves the lever.

For the purpose of bringing the slugs while in the mold to the proper height a knife P is mounted in position to act on the base of the slug as the latter is carried upward in the mold past the knife.

For the purpose of trimming the side faces of the slug as it is ejected I secure in the top of the frame $n$, as shown in Figs. 7, 8, &c., the two horizontal knives $q^{20}$ and $q^{21}$ in such position that the outgoing slug is directed between them into the receiving-galley $k^{10}$, formed on or attached to the top of the frame $n$. The vertically-vibrating arm $k^{12}$, also mounted on the top of the frame $n$, has one end extended across the galley in position to act under the edge of the incoming slug and turn the same to an upright position. The arm $k^{12}$ is depressed by a spring and lifted by a shoulder on the ejector-slide, which acts on the rear end of the lever as the slide advances to deliver the slug. The slugs are received against a friction-slide $k^3$ in the galley.

The distribution of the line of matrices and spacers is effected as shown in Figs. 1, 6, 7, 8, &c. The spacers are held in storage in a stationary magazine Q directly over the assembler G, so that when released they will fall one after another into the line with the matrices. This spacer-magazine with devices for releasing the spacers one at a time may be in all respects identical with that used in the Mergenthaler machines.

The matrices are distributed by means of the fixed horizontal bar R, overlying the upper end of the magazine B and provided along its lower edge with a series of permuted teeth adapted to engage the corresponding permuted teeth on the matrices and hold them in suspension as they are moved along the bar by the adjacent screws S until they arrive over their appropriate channels, when they disengage from the teeth and fall into the magazine.

The above parts may be identical with those in the Mergenthaler machine, as may also be the horizontal slide $r$ and attendant parts for shifting the matrix-line endwise after it is lifted and delivering the matrices from the line one at a time to the screws and to the distributer-bar. The mechanism, however, for lifting the line from the vise to the distributing devices is of novel construction. It consists, primarily, of an elevator T, having on its under side a horizontally-toothed bar $t$, (see Figs. 6, 18, 19, &c.,) adapted to engage the teeth of the matrix-line as the latter is pushed endwise from the vise J after the latter has been raised to its highest position. The elevator T is arranged to slide upward and downward on an inclined guide-bar $t^2$. In its lowermost position (shown in Figs. 1, 4, 6, 8, and 9) its toothed bar $t$ stands in position to engage the teeth of the entire line of matrices as the latter is pushed horizontally to the right out of the vise J, its movement being effected by the finger U, carried by a horizontal slide $u$, as shown in Fig. 9, the rise of the vise presenting this line between this finger and the elevator T.

The movement of the transfer-finger U is effected by teeth on one edge of its carrying-slide engaging the pinion $u^2$, (see Figs. 6 and 9,) carried on the upper end of the vertical rod $u^3$, mounted to turn in the frame and having its lower end provided with a screw-thread and extended through a nut $u^4$, carried by the vertically-movable vise-slide $u^5$, actuated by lever $u^6$ and cam $u^7$, so that the nut will cause the rotation of the threaded rod and pinion, and thereby cause the transfer slide and finger to push the matrix-line, including the spacers, out of the vise to the elevator T. During this transfer the elevator stands on top of an extension of the spacer-magazine Q, as shown in Figs. 3, 6, 7, 9, 18, and 19, this magazine having the inner faces of its walls grooved to engage the ears of the spacers Z and support them.

When the elevator T rises, it lifts the matrices Y away from the spaces Z, which are left suspended in their magazine Q, as shown in Figs. 18 and 19. A continued movement of the transfer-finger pushes the spacers forward to the inclined end of the magazine, where they descend by gravity. During the separation of the matrices from the spacers, as just described, it is necessary that they shall be lifted vertically before the elevator begins its travel upward on the inclined guide to the distributing mechanism. For this purpose the elevator T is made in two parts, and the lower part, which carries the toothed rib $t$, is constructed, as shown in Figs. 3, 6, 18, 19, and 20, to slide upon the remaining portion at right angles to the length of the guide and provided with a vertical slot $t^3$, entered by a fixed stud $t^4$. When the elevator begins its movement upward on the guide, this stud and slot compel the lower portion to rise vertically until the matrices are lifted clear of the spacers, after which the elevator continues its movement along the guide as a unit. The sliding motion of the elevator is secured by providing the under side of its guide $t^2$ with spiral teeth, which are engaged by the spiral-toothed wheel $t^5$, mounted between ears on the under side of the elevator on a revolving shaft $t^6$, which lies parallel with the guide. This shaft is grooved lengthwise to receive a spline on the toothed wheel. When the shaft is turned, it effects a rotation of the wheel, which through its engagement of its spiral teeth with those on the stationary guide is compelled to slide upward along the shaft, carrying with it the elevator until the latter presents the matrix-line in position to be shifted to the distributing mechanism by the slide $r$, before referred to. When the motion of the shaft is reversed, the elevator slides bodily down the guide until it arrives over the spacer-magazine Q, whereupon its ribbed member is lowered vertically to receive the next line of matrices.

Motion is communicated to the elevator-shaft, as shown in Fig. 6, by the pinion $t^7$, fixed on the end of the shaft, engaging a sector-rack $t^8$ on the end of lever $t^9$, pivoted at its lower end to the main frame and acted upon by a cam $t^{10}$ on the main shaft.

It will be observed that all of the main cams are mounted on the one horizontal shaft. Various parts driven from these cams for transferring the line, locking, unlocking, and justifying the same, operating the pump, the ejector, &c., are operated intermittingly, but the distributer, the keyboard connections, and the assembler are driven continuously, as usual, through belted connections from the main driving-wheel $y^2$. This pulley is connected with its shaft $y^3$ through an automatic one-revolution clutch, as usual, and its shaft is provided with a pinion $y^4$, engaging a gear-wheel $y^5$ on the main cam-shaft L. At the close of each revolution of the cam-shaft after a slug or linotype has been formed the clutch is disengaged and the parts driven by the cam-shaft stand at rest until the composition of the next line of matrices is completed. The clutch mechanism for this purpose may be identical with that used in the ordinary linotype-machine or otherwise constructed in any form which will cause its automatic action. The clutch is tripped into action to start the machine by a bar $y^6$, having one end adjacent to the keyboard and the opposite end connected with the clutch-controlling devices.

The machine may be constructed to use either the ordinary single-letter matrices or matrices having two letters arranged one above the other and separately usable, the matrices being set into the composed line at a higher or lower level, according as one or the other of the characters is to be employed.

I have shown the machine adapted for the two-letter matrices, the assembler being constructed with a movable blade to sustain the elevated matrices, as in United States Letters Patent to J. R. Rogers, No. 615,909.

The vise-head J is provided, as shown in Fig. 6, with a horizontal blade $j^{25}$ to sustain the elevated matrices in the line. These matrices must fall to the level of their companions before transference to the distributing devices. I therefore provide in the vise-head, as shown in Fig. 6, the upright pivoted fingers $j^{26}$, engaging the blade and having inclined surfaces which contact with fixed fingers $j^{27}$ in the top of the frame when the vise is raised. This arrangement automatically retracts the blade and permits the elevated matrices to fall to the lower level in the vise before the line is delivered therefrom.

Reference has been made to the slide $r$, Figs. 1, 2, &c., for pushing the elevated matrix-line horizontally from the elevator T into the distributer. This slide is operated, as shown in Fig. 1, forward by a spring and rearward through a link connected to a lever $r^2$, which is pivoted to the elevator-guide $t^2$ and formed with a lower arm or extension acted upon by a finger $r^3$ on the assembling-elevator. As the elevator passes it causes the slide to be retracted, so that the matrix-line is presented before it. As the elevator descends the finger $r^3$, which is spring-supported and beveled on the top, yields and passes under the arm, which is permitted to move inward and exert a continuing pressure endwise on the line under the influence of spring $r^5$.

It will be observed that in this machine the matrix-line is tranferred into the vise from one side at the assembling-level, then raised to the casting position, next moved horizontally toward the mold, and thereafter retracted from the mold and lifted in its original path to a higher level, at which the line is delivered from the vise at the side through which it entered. The line is at no time carried below the original composing or assembling level. The mold has two motions—first, that to and from the pot, and, second, the movement from the pot or casting level upward past the base-trimming knife to the ejector.

While I have described the machine as adapted to handle the matrices and spacers of the form commonly used in the Mergenthaler machine, it is to be understood that these parts may be modified in form and the machine modified accordingly, provided the general mode of operation is not departed from.

The expressions "line" and "matrix-line" as employed throughout this specification refer to the composed or assembled line of matrices, including the spacers, unless the contrary appears.

The expressions "assembling" and "composing" are synonymous, as are also the expressions "composed line," "assembled line," &c.

The operation of the machine is briefly as follows: The operator fingering the keys releases the matrices representing various characters in the order in which they are to appear in print and also spacers at the proper intervals. The matrices falling from the mouth of the magazine on the belt F descend in front of the star-wheel H, which crowds them successively into the assembler against the resisting-finger I, which gradually yields as the line is elongated. The spacers are dropped from their magazine Q directly into the assembler in front of the star-wheel, so that they become incorporated in the line. When the composition of a line is completed, the machine is started, and the slide $i^3$ is moved to the left, carrying the composed line, which is confined between the resistant I and the shoulders on the slide $i^3$, horizontally to the left, the matrices being sustained during their transfer in the assembler and the intermediate guide-channel in the frame, and finally delivered into the supporting-channel in the vise-head J, as shown in Figs. 6, 9, and 16. At this time the vise stands at the lower or assembling level, and the right-hand jaw $j^2$ is retracted, so that the line may pass it. The resisting-finger I is released and rises clear of the line, and the tranfer-slides return horizontally to the right to their original positions, the finger I advancing along its slide to a part near the star-wheel H. The vise $j'$ rises until the matrix-line is presented in front of the mold, as shown in Fig. 7, and the right-hand jaw $j^2$ advances past the end of the line, which is now sustained in the vise and confined between the two jaws, as shown in Figs. 9 and 16. The vise-supporting frame K swings rearward, carrying the line of matrices against the face of the mold with their ears seated under its edge, and the mold, through a swinging movement of its supporting-frame $n$, is carried back against the mouth of the pot. It will be observed that at this time the mold is closely confined against the matrices on one side and the mouth of the pot on the other. During or before the final locking together of the parts in this manner the justifier-plate M rises repeatedly and drives the wedge-spacers Z upward through the line, which is thereby elongated and justified, the matrices being forced into intimate contact with each other on their side faces, so that the passage of molten metal between them is prevented. The plunger $l$ in the melting-pot descends and forces the molten metal into the mold and against the line of matrices, thereby producing a slug or linotype having on its forward edge in relief the type characters formed by the matrices. The plunger rises, the vise-supporting frame swings forward to remove the matrices from the characters on the front edge of the slug contained in the mold, and the mold-supporting frame swings forward sufficiently to break the rear edge of the contained slug away from the mouth of the pot. The vise-head J rises, carrying the contained line upward to the left of the transfer-finger U. During this motion the screw is turned and the line-confining jaw $j'$ slightly retracted in order to loosen the matrices in the line and permit the wedge-spacers to drop therein to their normal positions or be pushed down by the overlying blade $y$ as they are lifted against it. The right-hand jaw $j^2$ is retracted clear of the line, the transfer-finger U moves to the right, pushing before it the line of matrices and spacers, the matrices engage the toothed rib of the elevator T, while the spacers enter and are supported by the extension of their magazine Q. The elevator rises and separating the matrices from the spacers carries them upward to the distributing mechanism at the top of the magazine. The transfer-slide U again advancing pushes the spacers forward until they reach the body of their magazine and descend by gravity to its front end. During the above operations the mold-supporting slide $n^2$ moves upward, lifting the mold, with the contained slug, past the stationary-base trimming-knife P and presenting it in front of the ejector-blade O, which advances and drives the slug out of the mold and between the trimming-knives $q^{20}$ and $q^{21}$ into the receiving-galley, where it is erected by the action of the arm $k^2$. The transfer-finger U returns to its original position, the mold is lowered to the casting-level, and the vise-head lowered to the assembling-level preparatory to the reception of the next line.

I believe myself to be the first to so construct and organize the parts of a linotype-machine that the pot, mold, the ejecting devices, and the galley stand in one and the same vertical plane. This arrangement permits the machine to be made narrower and more compact than would otherwise be possible. It will be observed that it is not necessary in my machine to carry the mold horizontally beyond the melting-pot or to locate the ejector or galley beyond the pot. In short, my construction admits of the machine being put in very compact form and of the slugs being delivered in such position that they may be readily reached and inspected by the operator at the keyboard.

Having described my invention, what I claim is—

1. In a linotype-machine, the combination of stationary means for supporting the composed line of matrices, the slide $i^3$ provided with means for transferring the composed line from the assembler, the horizontal slide $i$ movably mounted on the first-named slide, the resistant I mounted to slide vertically on the slide $i$, its actuating-spring, and its automatic locking device.

2. In a linotype-machine, the combination of an assembler into which the matrices are successively delivered, a vertically-movable resistant I, a horizontal slide $i$, to which said resistant is connected by a sliding joint, a main transfer-slide $i^3$, carrying the slide $i$ and provided with cheeks or shoulders lying behind the point of composition, to carry the composed line forward.

3. In a linotype-machine, the horizontal transfer-slide $i^3$, with shoulders to act behind the composed line and advance the same, a secondary slide $i$ thereon, a returning-spring for the secondary slide, a friction-dog to return the same as it is advanced by the incoming matrices, and a vertically-movable resistant I, mounted on the secondary slide.

4. In a linotype-machine, an assembler or receiver wherein the matrices are assembled in line, in combination with a horizontally-moving slide to transfer the matrices from the assembler, a vertically-movable vise to receive the matrices from the slide, and a melting-pot and mold located above the assembling level to coöperate with the matrix-line when raised by the elevator.

5. In a linotype-machine, a vertically-movable vise to carry the matrix-line, a vise-support movable around a horizontal axis, means for transferring the matrix-line to the vise at a low level, means for transferring the line from the vise for distribution at a high level, and a mold and coöperating devices located at an intermediate level to coöperate with the line in the vise.

6. In a linotype-machine, a vibrating frame K, having the line-sustaining device mounted to slide vertically therein, and the justifier-blade also mounted to slide therein, in combination with a stationary pot, the intermediate vertically and horizontally movable mold and an ejector located above the pot.

7. In a linotype-machine, the combination of the stationary pot, the horizontally-movable frames n and K, the vertically-sliding mold mounted in frame n, the vertically-movable vise mounted on frame K, the justifier-slide M, also mounted on frame K, means for transferring the assembled line horizontally into and out of the vise, and an ejector located above the casting level.

8. In a linotype-machine, a horizontally-vibrating frame K, a vertically-sliding vise carried thereby to sustain the matrix-line, and a horizontal slide for delivering the line from the vise, also carried by the frame K.

9. In a linotype-machine, a vertically and horizontally movable vise to carry the matrix-line and means for delivering the line into and out of the vise horizontally at different levels, in combination with a stationary pot and an intermediate vertically and horizontally movable mold.

10. In a linotype-machine, a vertically-movable non-rotating mold in combination with a melting-pot arranged to coöperate with the same at one level, and an ejector arranged to coöperate therewith at a different level.

11. In a linotype-machine, the combination of a melting-pot for delivering metal to the mold, an ejector for expelling the linotype from the mold, and a mold mounted to reciprocate vertically between the ejector and the pot.

12. In a linotype-machine, a metal-pot to deliver metal to the mold, an ejector-blade overlying the pot, a receiving-galley in front of the ejector, a mold to coöperate with the pot, and mechanism for moving the mold vertically and holding the mold at rest in front of the pot and the ejector alternately.

13. In a linotype-machine, a line-supporting vise mounted to move vertically, assembling and transferring devices arranged to deliver the line to the vise at a low level, and a mold and pot arranged to coöperate with the line at a higher level, whereby the carrying of the composed line below the assembling-level is avoided.

14. In a linotype-machine, in combination with a vertically-movable vise to support the matrix-line, means for delivering the composed line endwise thereto at a low level, a mold arranged to coöperate therewith at a higher level, means at a still higher level to remove the line from the vise and means at a still higher level to deliver the linotype from the mold.

15. In a linotype-machine, the combination of a stationary pot, an ejector at a higher level, an intermediate knife to trim the base of the linotype, a vertically-movable mold, and means for presenting the mold to the pot and thereafter carrying it past the knife to the ejector.

16. In a linotype-machine, a vise to support the matrix-line and present the same to the mold, means for delivering the line endwise into the vise, a stationary jaw on the vise opposite the front end of the incoming line, a movable jaw on the vise for confining the line at the rear end and means for opening the movable jaw and moving the line endwise out of the vise in a direction the reverse of that in which it entered.

17. In a linotype-machine and in combination with means for delivering a previously-composed line endwise thereto, a stationary jaw to act on the line at one end, a movable jaw to act on the same at the opposite end, automatic means for moving said jaw to and from its active position and means for removing the line endwise past the movable jaw.

18. In a linotype-machine, the line-supporting device J, movable vertically, a stationary jaw, means for introducing a composed line against said jaw, a movable jaw on the vise to act behind the line and means for automatically adjusting said jaw.

19. In a linotype-machine, a pot and mold, a vise for supporting the matrix-line in operative relation to the mold, means for raising the vise and line above the casting position, a spacer-magazine having one side in position to aline with the elevated vise, a matrix-elevator overlying the magazine, means for transferring the line from the vise to the magazine and means for lifting the matrices therefrom, leaving the spacers behind.

20. In a linotype-machine, the combination of the swinging frame K, the vertically-movable vise thereon with a fixed and a movable jaw, the justification-slide, the swinging-mold support, the vertically-sliding mold, the melting-pot, means for introducing the matrix-line horizontally to the vise in one direction, means for removing the line from the vise in the reverse direction, and means for delivering the linotype from the mold.

21. In a linotype-machine, the combination of a fixed pot, a movable mold to coöperate therewith, a vise movable to and from the mold, means for introducing the matrix-line endwise into the vise and means for removing the matrix-line in a reverse direction from the vise.

22. In combination with an assembler F, in which the matrices are assembled and alined, a transfer-slide $i^3$ with shoulders to push the composed line from the assembler, a secondary slide thereon, a finger on the secondary slide, movable into and out of the path of the matrices, a spring for retracting the secondary slide, a friction-dog on the main slide to return the secondary slide as it is advanced by the elongating line, and a rack-bar and pinion for moving the slide $i^3$.

23. In combination with the vertically-movable vise J, to sustain the matrix-line, the line-confining jaw $j'$, a screw for adjusting the same to relieve the line, and a crank-arm, a returning-spring, tripping devices for actuating the screw as the vise moves vertically.

24. In a linotype-machine and in combination with the vertically-movable vise, a retractible line-confining jaw $j'$ and means for automatically moving the same into and out of its operative position.

25. In a linotype-machine, the vertically-movable line-supporting vise, the sliding jaw $j^2$, the adjusting-dog pivoted to its end, the springs operating therewith, and a stationary rib against which the tripping device acts during the movement of the vise, to effect the adjustment of the jaw.

26. In a linotype-machine, a line-supporting vise mounted to move vertically, in combination with a justifier-slide M, mounted on and carried by the vise, having motion independent thereof.

27. In a linotype-machine, the combination of the justifier-slide M, its actuating-lever and spring and the serrated lever $m^3$, to operate the first-named lever.

28. In a linotype-machine, the swinging mold-carrying frame $n^2$, the mold mounted to slide vertically therein, and the trimming-knives $q^{20}$ and $q^{21}$, also mounted on said frame.

29. In a linotype-machine, in combination with a stationary pot, a swinging frame $n$, provided with a stationary knife to trim the base of the slug, and the mold N, mounted to slide vertically on said frame from its operative relation to the pot, past the trimming-knife.

30. In combination with the finger U, for transferring a matrix-line and its carrying-slide, the rack on the latter, its operating-pinion, the screw for turning the pinion and vertically-movable nut for operating the screw.

31. In a linotype-machine, the matrix-line elevator comprising the inclined guide, the slide therein and the toothed bar mounted to slide upon the first-named slide, whereby the matrices may be lifted vertically from the spacers, then transferred and carried in an inclined path to the distributer.

32. In a linotype-machine, a support for the matrix-line, including the spacers, a toothed elevator-bar to lift the matrices, and means substantially as shown for lifting the elevator first vertically and thereafter in an inclined path to the distributer.

33. In a linotype-machine, the combination of the guide-bar $t^2$, provided with teeth, the elevator T, arranged to slide therein, and the spirally-toothed wheel carried by the elevator and engaging the bar, whereby the rotation of the wheel is caused to effect the movement of the elevator along the guide.

34. In a linotype-machine, the guide-bar $t^2$, provided with teeth, the matrix-line elevator T, mounted to slide thereon, the spirally-toothed wheel carried by the elevator and engaging the teeth of the bar, and a driving-shaft $t^6$ lying parallel with the guide-bar and having a sliding connection with the wheel, whereby the rotation of the shaft is caused to move the elevator in the direction of its length.

35. In a linotype-machine, the swinging vise-carrying frame, the swinging mold-carrying frame, and an operating-lever $k^5$ connected at different distances from its center with the respective frames, whereby it is caused to impart a differential movement to said frames.

36. In a linotype-machine, an elevator to remove the matrices from the composed line of matrices and spacers, a magazine for the spacers, and a single transfer device arranged to advance the line to the elevator, and continue its advance to deliver the spacers to their magazine after the separation of the matrices.

37. In a linotype-machine, means for removing the composed line of matrices and spacers from the casting position, a transferring device arranged to remove and act on the line, and to advance by two steps to the spacer-magazine, and an elevator arranged to remove the matrices at the end of the first step.

38. In a linotype-machine, a single transfer device arranged to first present the composed line of matrices and spacers to a mechanism for removing the matrices, and thereafter continuing its advance and delivering the spacers to their magazine.

In testimony whereof I hereunto set my hand, this 18th day of December, 1902, in the presence of two attesting witnesses.

PHILIP T. DODGE.

Witnesses:
JOHN F. GEORGE,
ANTHONY J. STEIDEL.